(12) United States Patent
Harmon et al.

(10) Patent No.: US 8,080,980 B2
(45) Date of Patent: Dec. 20, 2011

(54) ALTERNATOR REGULATOR WITH AUTOMATIC REGULATION DEPENDENT ON SYSTEM VOLTAGE

(75) Inventors: Jack D. Harmon, Carmel, IN (US); Mingshe Zhou, Fishers, IN (US)

(73) Assignee: Remy Technologies, L.L.C., Pendleton, IN (US)

( * ) Notice: Subject to any disclaimer, the term of this patent is extended or adjusted under 35 U.S.C. 154(b) by 469 days.

(21) Appl. No.: 12/402,105

(22) Filed: Mar. 11, 2009

(65) Prior Publication Data

US 2010/0231180 A1    Sep. 16, 2010

(51) Int. Cl.
*H02P 9/00* (2006.01)
(52) U.S. Cl. ............................ 322/28; 322/24
(58) Field of Classification Search ............... 322/28, 322/24, 44
See application file for complete search history.

(56) References Cited

U.S. PATENT DOCUMENTS

| | | |
|---|---|---|
| 4,388,587 A | 6/1983 | Lamoth et al. |
| 5,164,655 A | 11/1992 | Heavey |
| 5,691,590 A | 11/1997 | Kawai et al. |
| 6,037,753 A | 3/2000 | Uematsu et al. |
| 6,078,203 A | 6/2000 | Zafarana et al. |
| 6,294,899 B1 * | 9/2001 | Tokugawa et al. .......... 322/28 |
| RE37,609 E | 3/2002 | Bittner |
| 6,392,348 B1 | 5/2002 | Dougherty |
| 6,507,506 B1 | 1/2003 | Pinas et al. |
| 6,570,289 B1 | 5/2003 | Liang et al. |
| 6,639,391 B2 | 10/2003 | Huang et al. |
| 7,106,030 B2 | 9/2006 | Isurin et al. |
| 7,235,952 B2 * | 6/2007 | Maehara .................... 322/24 |
| 7,271,570 B2 | 9/2007 | O'Gorman et al. |
| 7,283,899 B1 | 10/2007 | Harmon et al. |
| 7,535,203 B2 * | 5/2009 | Aoyama ...................... 322/24 |
| 7,602,153 B2 * | 10/2009 | Steiner ........................ 322/59 |
| 2009/0254242 A1 * | 10/2009 | Kura ............................ 701/33 |
| 2010/0123439 A1 * | 5/2010 | Steele et al. ................ 322/24 |

* cited by examiner

*Primary Examiner* — Nguyen N Hanh
(74) *Attorney, Agent, or Firm* — Maginot, Moore & Beck (57) ABSTRACT

An alternator configured for use in a vehicle comprises a stator having a plurality of stator windings. A rotatable field coil is positioned adjacent to the stator within the alternator. A field driver circuit is configured to deliver an electric current to the field coil. A voltage sensor is configured to detect a battery voltage. A controller in the alternator is configured to execute either a first field current control program or a second field current control program depending at least in part upon the detected battery voltage. The first field current control program is configured to control the electric current delivered to the field coil in a 12 volt vehicle power system. The second field current control program is configured to control the electric current delivered to the field coil in a 24 volt vehicle power system.

18 Claims, 5 Drawing Sheets

ALTERNATOR REGULATOR WITH AUTOMATIC REGULATION DEPENDENT ON SYSTEM VOLTAGE

FIELD

This application relates to the field of vehicle electric systems and more particularly, to arrangements and methods for controlling a vehicle alternator.

BACKGROUND

Alternators are used to convert mechanical energy from a vehicle engine into electrical energy for the vehicle. The electrical energy produced by the alternator is used to charge the vehicle battery, and may also be used to power electric loads on the vehicle.

The alternator generally includes a rotatable field coil positioned within a stator having a plurality of stator windings. Operation of the engine results in rotation of the field coil. Current flowing through the rotating field coil provides a rotating magnetic field. This rotating magnetic field induces an AC output voltage in the stator windings. The AC voltage in the stator windings is rectified and delivered to the vehicle battery and/or electric loads on the vehicle.

Modern vehicle alternators include a regulator that controls the current through the field coil. In general, when more current is provided to the field coil, the output voltage of the alternator increases. When less current is provided to the field coil, the output voltage of the alternator decreases.

Vehicle alternators are configured for use with different systems. For example, a typical passenger automobile operates with a 12 volt power system. Thus, the vehicle alternator in a typical automotive application must be configured to output about 12 volts in order to charge the 12 volt battery. More heavy duty applications, such as busses and construction equipment, typically operate using 24 volt or greater power systems. Thus, the vehicle alternator in heavy duty applications must be configured to output 24 volts or more in order to charge the 24 volt or greater battery system.

Because of the different output levels required from different applications, manufacturers must produce numerous alternators and regulators for use in different alternator applications. It is expensive for manufacturers to produce various different regulators and then install the appropriate regulator in a particular alternator such that the alternator is properly configured for a particular power system. Accordingly, it would be advantageous to provide an alternator that is capable of use in multiple applications, thus allowing the manufacturer to save money and resources by manufacturing alternators that may be used interchangeably in various applications.

SUMMARY

An alternator configured for use in a vehicle comprises a stator having a plurality of stator windings. A rotatable field coil is positioned adjacent to the stator within the alternator. A field driver circuit is configured to deliver an electric current to the field coil. A voltage sensor is configured to detect a battery voltage. A controller in the alternator is configured to execute either a first field current control program or a second field current control program depending at least in part upon the detected battery voltage. The first field current control program is configured to control the electric current delivered to the field coil in a 12 volt vehicle power system. The second field current control program is configured to control the electric current delivered to the field coil in a 24 volt vehicle power system.

In at least one embodiment, the controller configured to execute the field current control program is provided in a regulator housed within the alternator. The controller is positioned within a regulator, the regulator includes a memory with the first field current control program and the second field current control program stored in the memory. The controller is configured to continue execution of either the first field current control program or the second field current control program until a reset instruction is received by the regulator. The reset instruction may comprise, for example, removing regulator power and subsequently restoring regulator power.

The above arrangement for an alternator further provides for a method of operating an alternator in a vehicle. The method comprises sensing a battery voltage and executing either a first field current control program or a second field current control program depending at least in part upon the detected battery voltage. The first field current control program is configured to control the electric current delivered to the field coil in a 12 volt vehicle power system. The second field current control program is configured to control the electric current delivered to the field coil in a 24 volt vehicle power system. A controller continues to execute either the first field current control program or the second field current control program until a reset instruction is received. In at least one alternative embodiment, the method further comprises the step of receiving vehicle identification information from an electronics control module positioned in the vehicle. The vehicle identification information may include, for example, vehicle make and model identification information. According to the alternative method, the field current control program executed by the alternator is dependent at least in part on the vehicle identification information from the electronics control module.

The above described features and advantages, as well as others, will become more readily apparent to those of ordinary skill in the art by reference to the following detailed description and accompanying drawings. While it would be desirable to provide an alternator that provides one or more of the foregoing or other advantageous features as may be apparent to those reviewing this disclosure, the teachings disclosed herein extend to those embodiments which fall within the scope of the appended claims, regardless of whether they accomplish one or more of the above-mentioned advantages.

DESCRIPTION

Figure 1:
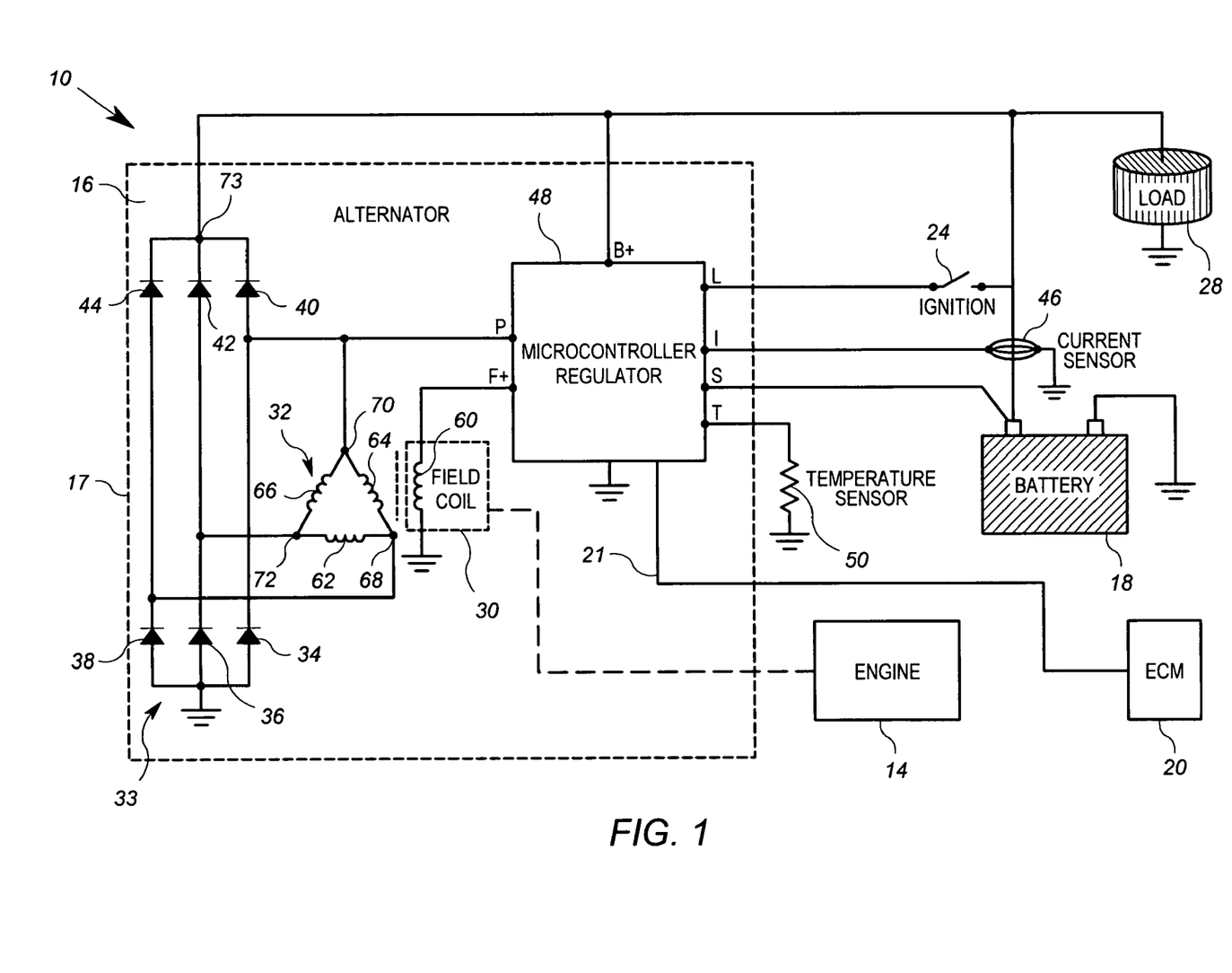
FIG. 1 is a block diagram of a vehicle having an engine and an alternator operable to control a rotor field current based on the system voltage of the vehicle.

Referring to FIG. 1, a motor vehicle 10 having a vehicle alternator 16 in accordance with an exemplary embodiment is illustrated. The vehicle 10 further includes an engine 14 and a battery 18 provided within a body and supported by a vehicle chassis. The word "vehicle" as used herein refers to any device designed to carry or transport something or someone, including, without limitation, cars, trucks, boats, trains and planes.

The engine 14 provides a drive torque for moving the vehicle 10. The engine 14 is coupled to a rotor 30 of the alternator 16 such that operation of the engine 14 results in rotation of the rotor 30. In particular, when an ignition switch 24 is closed, electrical current from the battery 18 is delivered to a starter motor (not shown). When the starter motor is energized, it cranks the engine 14. When the engine 14 fires, the rotor 30 spins and the alternator 16 generates an output voltage at node 73. The output voltage of the alternator 16 is utilized to electrically charge the battery 18 and is also utilized by other electrical devices of the vehicle 10 as represented by the vehicle load 28.

With continued reference to FIG. 1, the alternator 16 includes the rotor 30, a stator 32, a rectifier 33, and a voltage regulator 48, all positioned within a housing 17. The housing 17 is typically a metal casing, such as a steel casing or a cast aluminum casing. However, it will be recognized that the housing 17 could also be comprised of any other suitable material.

The rotor 30 of the alternator 16 includes a field coil 60 that receives a signal from the regulator 48 having a predetermined duty cycle as controlled by the regulator operating a field current control program. The stator 32 is positioned around the rotor 30. The stator 32 generates an output current at node 73 having a magnitude that is based on the duty cycle of the signal applied to the field coil 60. The stator 32 includes phase coils 62, 64, 66 coupled in a Delta-configuration. In another exemplary embodiment, the phase coils 62, 64, 66 are coupled in a Y-configuration.

The stator 32 is electrically coupled to the rectifier 33, which delivers the alternator output at node 73. The rectifier 33 includes diodes 34, 36, 38, 40, 42, 44. In the embodiment of FIG. 1, the phase coil 64 is electrically coupled between node 70 and node 68. The phase coil 66 is electrically coupled between node 70 and node 72. The phase coil 62 is electrically coupled between node 72 and node 68. The diode 34 is electrically coupled between node 70 and electrical ground; the diode 36 is electrically coupled between node 72 and electrical ground; and the diode 38 is electrically coupled between node 68 and electrical ground. The diode 44 is electrically coupled between node 68 and node 73; the diode 42 is electrically coupled between node 72 and node 73; and the diode 40 is electrically coupled between node 70 and node 73.

Figure 2:
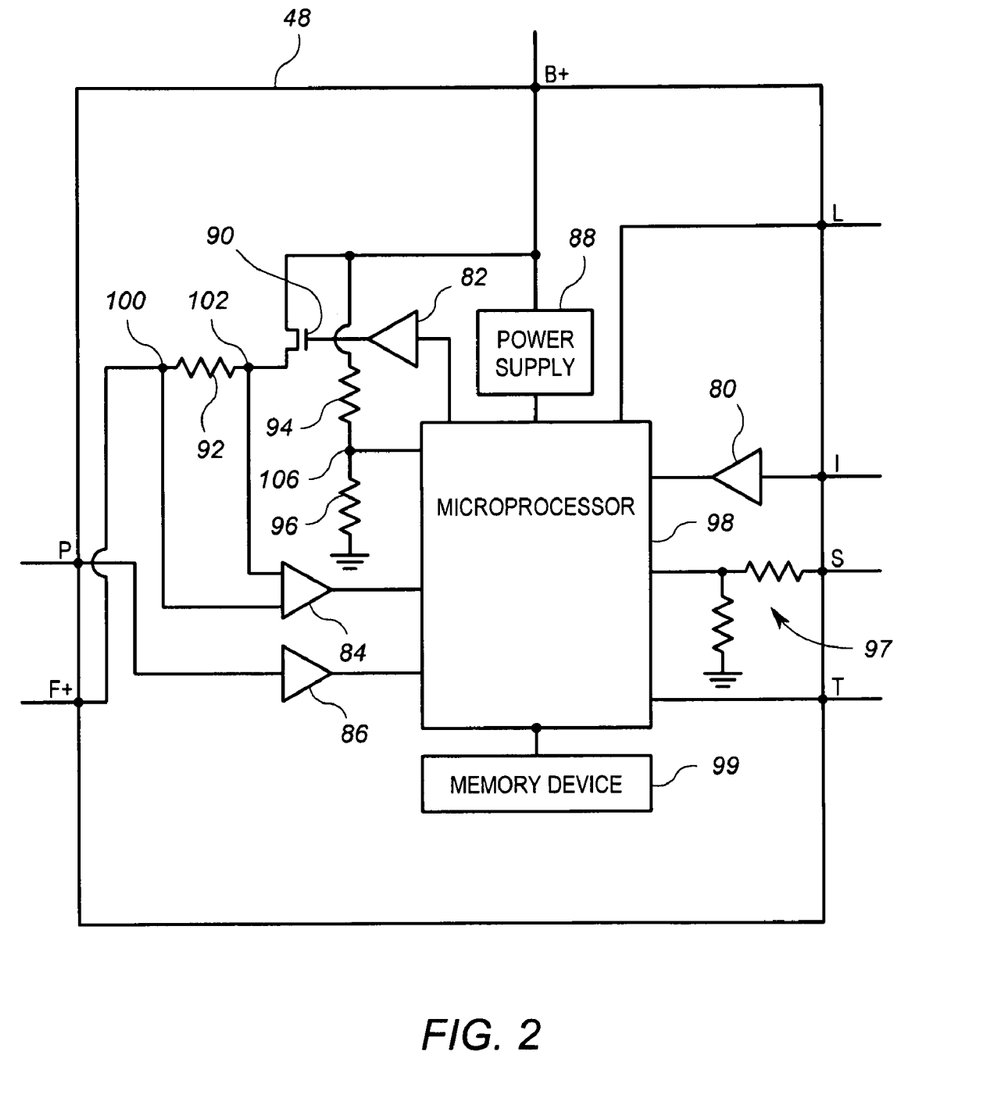
FIG. 2 is a block diagram of an exemplary internal regulator with a field driver circuit for use with the alternator of FIG. 1.

The current sensor 46 provides an output signal that is indicative of an amount of current flowing to/from the battery 18. As shown in FIG. 2, when the output signal from the current sensor is delivered to the regulator 48 it is passed through an amplifier 80. The amplifier 80 amplifies the signal from the current sensor 46 and sends the amplified signal to the microprocessor 98 of the regulator 48. The microprocessor 98 utilizes the amplified signal to determine the amount of current flowing to or from the battery 18.

The voltage regulator 48 is provided to control an output voltage and an output current from the alternator 16. The regulator 48 is housed entirely within the housing 17 of the alternator 16 as shown in FIG. 1. However, in other embodiments, the regulator 48 may be positioned outside of the alternator housing 17.

FIG. 1 shows various inputs/outputs for the regulator 48. These inputs/outputs are designated as F+, P, B+, L, I, S and T. FIG. 1 also shows a ground connection for the regulator 48.

The F+ output designates the regulator connection to the field coil 60. The P input designates the regulator connection to the stator windings. The B+ input designates the regulator connection to the battery 18. The L connection designates the regulator connection to the ignition switch 24. The I input designates the regulator connection to the current sensor 46, and this input provides an indication of the current flowing to or from the battery. The S input designates the external sense connection to the battery. Because the S input is an uninterrupted, direct connection to the battery it may provide a more accurate measurement of the voltage to the battery than the B+ line (i.e., by reducing resistance losses seen in the line from the B+ input to the battery). The T input designates the regulator connection to the temperature sensor 50 which may be located within the alternator housing 17 or outside of the alternator housing.

With particular reference now to FIG. 2, the regulator 48 of the alternator 16 is shown, including various components, such as an internal microprocessor 98. It will be recognized that the microprocessor 98 and the various components of the regulator 48 may be provided together on a single chip/printed circuit board. Alternatively, the various components of the regulator 48 may be provided separately and wired to the microprocessor.

As shown in FIG. 2, the various components of the regulator 48 include amplifiers 80, 82, 84, 86, a power supply 88, a transistor 90, resistors 92, 94, 96, a voltage divider 97, a microprocessor 98, and a memory device 99. The power supply 88 is electrically coupled between node 73 and a microprocessor 98. The power supply 88 is configured to provide an operational voltage to the microprocessor 98. The amplifier 82 and the transistor 90 provide the main components of a field driver circuit. The field driver circuit is controlled by the microprocessor 98 and is configured to control the field current provided to the field coil at output F+.

The amplifier 82 of the field driver circuit may be provided as a MOSFET with the output of the amplifier 82 connected to the gate of MOSFET. The amplifier 82 amplifies a control signal from the microprocessor 98 which is configured to control the transistor 90 by switching the transistor between an on-state and an off-state. Thus, the amplifier 82 includes circuitry required to drive the gate terminal of the transistor 90. The drain terminal of the transistor 90 is electrically coupled to node 73, and the source terminal of the transistor 90 is electrically coupled to node 102. A resistor 92 is electrically coupled between node 102 and node 100 which is electrically coupled to the field coil 60 of the rotor 30. During operation, the microprocessor 98 adjusts the control signal output to the amplifier 82 in order to switch the transistor 90 on and off. As explained in further detail below, by controlling transistor switching, the duty cycle, frequency, or other variable of the field current output at F+ can be controlled.

As further illustrated in FIG. 2, the resistor 94 is electrically coupled between node 73 (at the B+ input) and node 106. The resistor 96 is electrically coupled between node 106 and electrical ground. In addition, node 106 is electrically coupled to the microprocessor 98. The microprocessor 98 monitors the voltage at node 106, thus providing feedback to the microprocessor concerning the output voltage of the stator 32.

With continued reference to FIG. 2, the amplifier 84 has first and second input terminals electrically coupled to nodes 100 and 102, respectively. Further, the amplifier 84 has an output terminal electrically coupled to the microprocessor 98. The microprocessor 98 monitors the signal output by the amplifier 84 to determine the field current received by the field coil 60. This input to the microprocessor 98 may also be used to detect a short circuit fault condition of the field coil 60.

The amplifier 86 is electrically coupled between node 70 and the microprocessor 98. The amplifier 86 amplifies a signal output at the stator node 70 and delivers it to the microprocessor 98. The microprocessor 98 is configured to determine a frequency of AC phase voltage of the stator 30 based on the amplified signal from the amplifier 86. Further, the microprocessor 98 is configured to determine a value indicative of the rotational speed of the rotor 30 based on the frequency of the AC phase voltage of the stator 32.

As also shown in FIG. 2, a resistive voltage divider circuit 97 is positioned in the regulator 48 between input S and the microprocessor 98. The voltage divider circuit 97 delivers an output voltage to the microprocessor 98 that is a fraction of the input voltage received from the battery at input S. The voltage divider circuit includes a first resistor 97a and a second resistor 97b. The first resistor 97a is connected between the S input and the microprocessor 98. The second resistor 97b is connected between the microprocessor 98 and ground. The values for the resistor are chosen to provide the proper resolution to the microprocessor for the battery voltage.

In at least one alternative embodiment, in addition to the first voltage divider circuit 97, a second voltage divider circuit may be provided between the S input and another input to the microprocessor 98. In this embodiment, the first voltage divider would be configured to provide a proper resolution for a 12V system and the second voltage divider would be configured to provide a proper resolution for a 24V system. The microprocessor 98 would then select which of the two voltage dividers to monitor during operation of the alternator based on whether a 12V or 24V system was detected by the microprocessor.

Returning again to FIG. 1, in at least one embodiment, the vehicle 10 further includes an engine control module 20 (ECM). The engine control module 20 is provided to control operation of the engine 14. The engine control module 20 operably communicates with the engine 14 and the alternator 16 via a communication bus 21. The communication bus is utilized to send and receive data between the ECM 20 and the alternator 16. When the ECM is used, various types of data that would otherwise be sent directly to the microprocessor 98 may first be routed through the ECM, stored in the ECM and then passed on to the microprocessor through the ECM connection. For example, signals from the current sensor 46 and the temperature sensor 50 may be provided via the ECM 20. Other types of data may also be stored in the ECM, such as vehicle identification information. Vehicle identification information may include, for example, alpha-numeric codes that identify the vehicle make, model and year. MP regulator sense may also be monitored by the ECM and communicated to the regulator, if desired.

The microprocessor also receives inputs in addition to those described above. For example, as shown in FIGS. 1 and 2, the microprocessor 98 may also receive inputs from the current sensor 46 (input I) via amplifier 80, the ignition switch 24 (input L), and the temperature sensor 50 (input T). A memory device 99 is also connected to the microprocessor 98. The memory device 99 is configured to store computer executable instructions utilized by the microprocessor 98 and associated data for implementing methods that will be described in further detail below.

Figure 3:
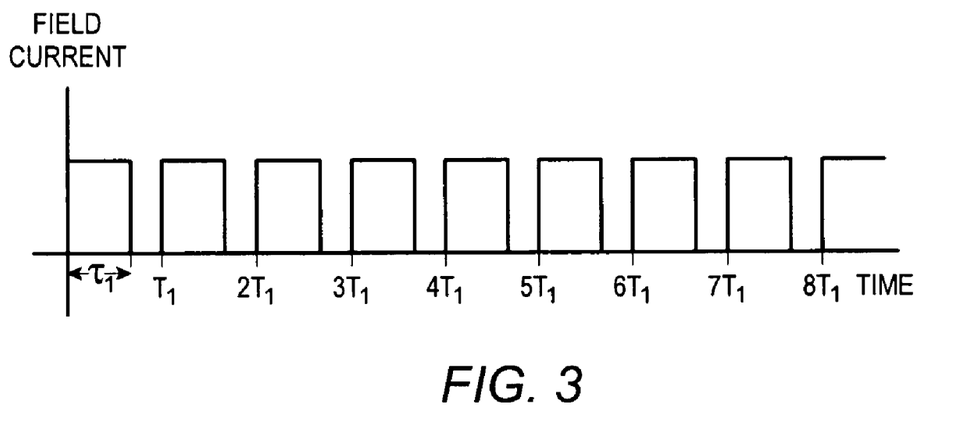
FIG. 3 is a grid showing an exemplary switching scheme for the field driver circuit of FIG. 2.

The microprocessor/controller 98 monitors various alternator and vehicle conditions and controls operation of the voltage regulator 48 depending on these conditions. In particular, the microprocessor 98 controls the field current output by the regulator 48 by delivering control signals to the gate of the transistor 90. These control signals switch the transistor 90 on and off such that the field current is provided as a pulse signal, such as that shown in FIG. 3. In FIG. 3, the pulse duration of the field current is shown as $\tau_1$ and the period of the pulse is shown as $T_1$, with the duty cycle (D) calculated as $D=\tau_1/T_1$. Depending on the inputs received, the microprocessor 98 may adjust the duty cycle D in an attempt to control alternator output by increasing or decreasing the pulse duration $\tau$. It will be recognized that in addition to adjusting the pulse duration $\tau$ in an attempt to control alternator output, the alternator disclosed herein is further configured to adjust other field current variables, such as the frequency of the pulse in the field current, or other variables in order to control the alternator output.

As discussed in the foregoing paragraphs, the regulator 48 is configured to receive various inputs which allow the regulator to detect various alternator conditions and/or vehicle engine conditions. The regulator 48 then controls the current delivered to the field coil 60 based on these detected conditions. One condition the alternator is configured to sense is the battery voltage provided at input S (see FIGS. 1 and 2). Based on the battery voltage, the regulator will generally allow more or less current to flow through the field coil. If the battery voltage is low, the regulator may increase the current delivered to the field coil. The temperature sensor 50 is another sensor that may be used to deliver a signal to the alternator indicative of an operating condition. If the sensed internal alternator operating temperature exceeds a predetermined threshold amount, the microcontroller 98 may reduce the current flowing through the field coil. Battery voltage and temperature are but a few of many parameters that the regulator may monitor. Other examples of sensed parameters include rotor speed, pulse width from the field driver circuit, efficiency of the alternator, temperature outside of the alternator, or magnetic noise of the alternator.

The regulator 48 disclosed herein is adapted for use with either a 12V or a 24V vehicle power system. Thus, a single regulator model may be used in different types of alternators, including alternators configured for use in 12V power systems and alternators configured for use in 24V power systems. To this end, the memory device 99 in the regulator 48 includes at least two different field current control programs that may be executed by the microprocessor 98. A first field current program is used when the regulator is installed in a 12V alternator and the second field current program is used when the regulator is installed in a 24V alternator. Each of the programs is designed to control the field driver circuit and thus control the field current through the alternator field coil 60. However, each of the programs operates differently, depending on the type of alternator being controlled as well as the various vehicle inputs provided to the alternator. For example, the program configured for use with a 12V operating system would call for one field current duty cycle based on a given sensed voltage, temperature, and other inputs, while the program configured for use with a 24V operating system would call for a different field current duty cycle based on the same sensed voltage, temperature, and other inputs. When the regulator runs the program for the 12V operating system, the regulator may be considered to operate in a 12V mode; when the regulator runs the program for the 24V operating system, the regulator may be considered to operate in a 24V mode.

With the regulator configured to operate in either a 12V mode or a 24V mode, a single regulator model may be produced by a manufacturer and that single regulator model may be used in any of various different alternators. This allows the manufacturer to achieve efficiencies of scale, by producing a greater number of a single part rather than smaller numbers of different parts.

Figure 4:
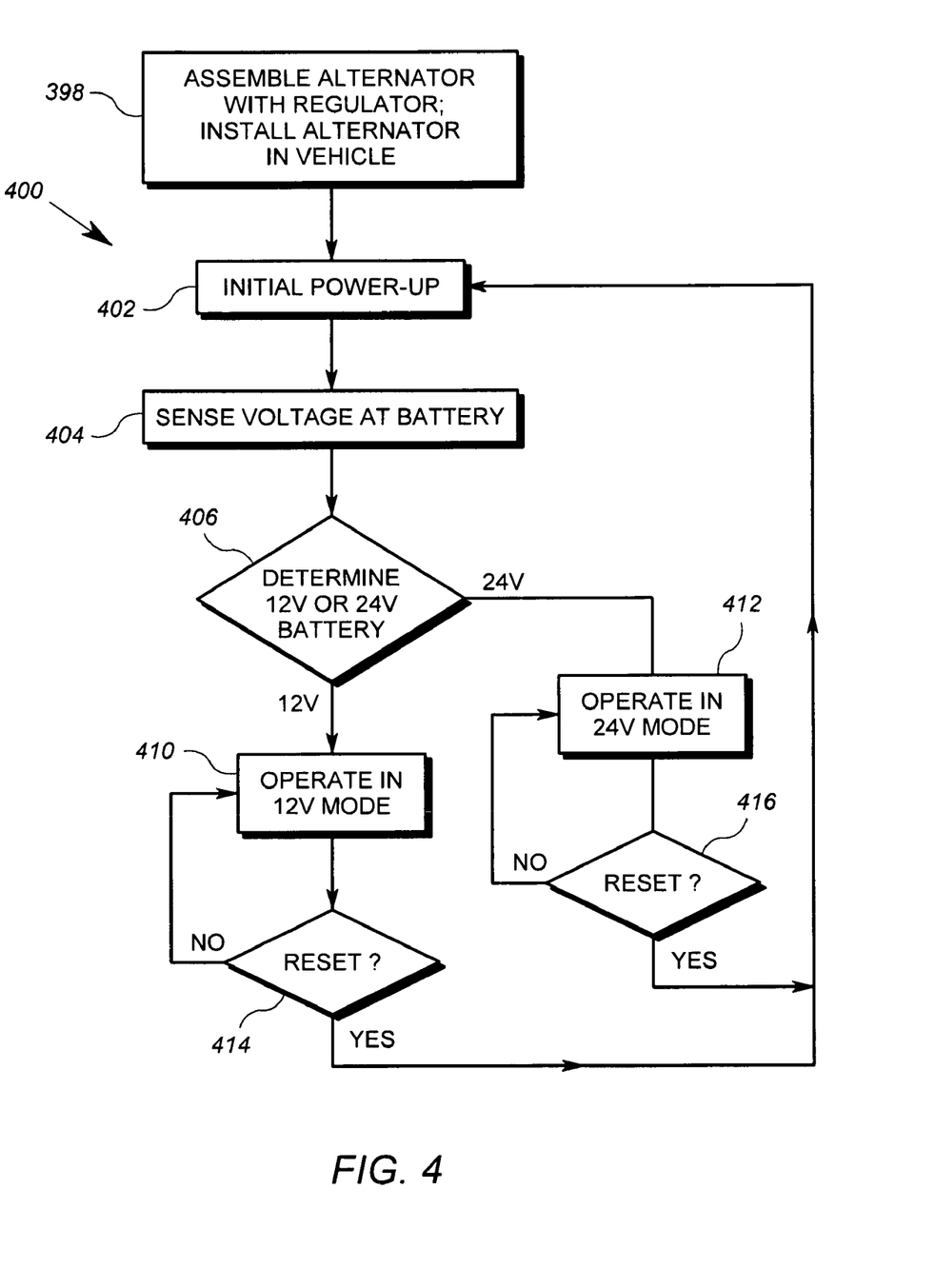
FIG. 4 is a flow chart showing a method of operating the alternator regulator of FIG. 1.

The regulator 48 is configured to perform an initial set-up routine to which determines whether the regulator 48 will operate in the 12V mode or a 24V mode. An exemplary set-up routine is shown in FIG. 4. The set-up routine 400 of FIG. 4 begins after the regulator 48 has been positioned in an alternator and assembled in a vehicle, as indicated in step 398. The set-up routine begins with step 402 when the microprocessor 98 in the regulator is initially powered up. This power-up generally begins when power is provided to the regulator, such as when the positive battery terminal is connected to the power cable in a motor vehicle during assembly of the motor vehicle.

Once power is provided to the regulator 48 in step 402, the microprocessor 98 senses the battery voltage in step 404. In the arrangement of FIGS. 1 and 2, the microprocessor senses the battery voltage at the S input to the regulator. The sensed battery voltage indicates to the regulator 48 whether it should operate in a 12V mode or a 24V mode. In particular, if the microprocessor 98 senses a 12V battery voltage at input S, the microprocessor will execute a field current control program from the regulator memory 99 that operates the alternator for a 12V power system. On the other hand, if the microprocessor 98 senses a 24V battery voltage at input S, the microprocessor will execute a field current control program from the regulator memory that operates the alternator for a 24V power system.

After the regulator senses the battery voltage at step 404, a determination is made in step 406 whether the power system is a 12V power system or a 24V power system. If it is determined that the power system is a 12V power system, the processor proceeds to step 410 where it selects and begins execution of a field current control program from the regulator memory 99 that causes the alternator to operate in a 12V mode. Alternatively, if it is determined that the power system is a 24V power system, the processor proceeds to step 412 and selects and begins execution of a field current control program from the regulator memory 99 that causes the alternator to operate in a 24V mode.

Once the regulator determines that the alternator should operate in either the 12V mode or the 24V mode, the regulator continues to operate this program until a reset instruction is received in step 414 or 416. The reset instruction is typically received when power to the alternator is shut off, such as when the alternator is disconnected from the battery and a new battery is installed. In this case, when power is restored to the alternator in step 402, the regulator proceeds through the set-up routine 400 to select an appropriate field current control program. In at least one alternative embodiment, the reset instruction may be provided upon the occurrence of some event other than a power outage, such as the toggle of a physical switch provided on the regulator. In either event, the regulator continues operation in the originally selected mode until the reset instruction is provided. Thus, the regulator performs an initial selection of the proper mode and/or field current control program to run and continues in this mode indefinitely. The regulator does not continually switch between different modes of operation.

Figure 5:
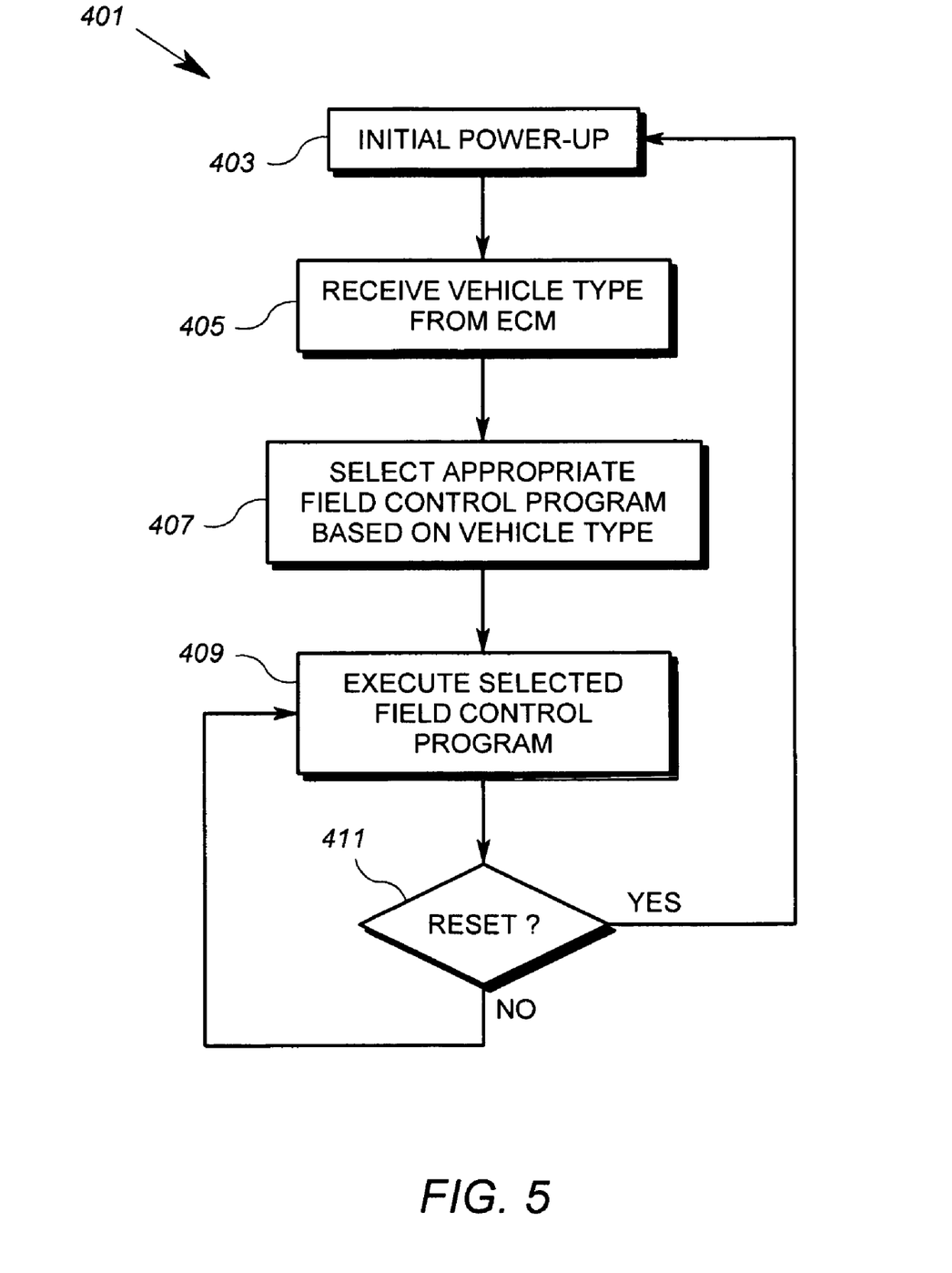
FIG. 5 is a flow chart showing an alternative method of operating the alternator regulator of FIG. 1.

In at least one alternative embodiment, instead of or in addition to sensing the battery voltage at input S in step 404, an additional or different regulator input is monitored in step 404. An example of such an alternative set-up routine 401 is shown in FIG. 5. In this routine 401, the regulator is powered up as normal in step 403. Following initial power up, the method 401 moves to step 405 where the regulator communicates with the ECM 20 (see, e.g. FIG. 1). Communication with the ECM 20 allows the regulator to obtain information concerning the vehicle where the alternator is installed. An example of such vehicle information communicated to the regulator includes the make, model and year of the vehicle. Based on this vehicle information, the regulator 48 determines an appropriate field current control program to run, as noted in step 407. For example, if the vehicle information indicates that the alternator has been installed in a particular make and model of passenger car, the regulator would utilize a 12V field current control program from memory 99 for controlling the alternator in a 12V power system. On the other hand, if the vehicle information indicates that the alternator has been installed in a particular make and model of truck, the regulator may utilize a 24V field current control program from memory 99 for use in controlling the alternator in a 24V power system. Accordingly, it will be recognized that numerous different 12V field current control programs may be stored in the regulator for use with different 12V alternators. Similarly, numerous different 24V field current control programs may be stored in the regulator for use with different 24V alternators. The regulator may include look-up tables or other information to help the regulator decide which field current control program to run based upon the information received from the ECM.

After selecting an appropriate field current control program for use in step 407, the regulator executes the selected program in step 409. The regulator continues operation in this mode by continuing with step 409 until a reset instruction is received in step 411. In step 411, the processor determines that a reset instruction has been received (e.g., power has been removed from the regulator or a switch has been moved). Following a reset instruction, the regulator returns to step 403 to start the set-up routine 401 once again and select what field control program that should be utilized by the regulator.

While the invention has been described with reference to exemplary embodiments, it will be understood by those skilled in the art that other implementations and adaptations are possible. For example, various changes may be made and equivalent elements may be substituted for elements thereof without departing from the scope of the invention. Furthermore, the alternator may be configured with additional or less inputs to the regulator and remain operational. For example, the current sensor 46 and/or temperature sensor 50 inputs described above could be completely removed from the regulator, while still allowing operation of the regulator. In addition to the foregoing examples, many modifications may be made to adapt a particular situation or material to the teachings of the invention without departing from the essential scope thereof. Also, there are advantages to individual advancements described herein that may be obtained without incorporating other aspects described herein. Therefore, it is intended that the invention not be limited to the particular embodiment disclosed for carrying out this invention, but that the invention will include all embodiments falling within the scope of the appended claims.

What is claimed is:

1. An alternator configured for use in a vehicle, the alternator comprising:
   a stator including a plurality of stator windings;
   a rotatable field coil adjacent to the stator;
   a field driver circuit, the field driver circuit configured to deliver an electric current to the field coil;
   a voltage sensor configured to detect a battery voltage; and
   a controller configured to execute either a first field current control program or a second field current control program depending at least in part upon the detected battery voltage, wherein the first field current control program is configured to control the electric current delivered to the field coil in a 12 volt vehicle power system and the second field current control program is configured to control the electric current delivered to the field coil in a 24 volt vehicle power system.

2. The alternator of claim 1 wherein the controller is provided in a regulator housed within the alternator.

3. The alternator of claim 1 wherein the voltage sensor is provided as a voltage divider circuit within the regulator.

4. The alternator of claim 1 wherein the controller is positioned within a regulator, the regulator including a memory, wherein the first field current control program and the second field current control program are stored in the memory.

5. The alternator of claim 1 wherein the controller is positioned within a regulator and wherein the controller is configured to continue executing the first field current control program or the second field current control program until a reset instruction is received by the regulator.

6. The alternator of claim 5 wherein the reset instruction comprises removing regulator power and subsequently restoring regulator power.

7. A method of operating an alternator in a vehicle, the method comprising:
   a) sensing a battery voltage;
   b) executing either a first field current control program or a second field current control program depending at least in part upon the detected battery voltage, wherein the first field current control program is configured to control the electric current delivered to the field coil in a 12 volt vehicle power system and the second field current control program is configured to control the electric current delivered to the field coil in a 24 volt vehicle power system.

8. The method of claim 7 wherein a controller in the alternator performs the step of executing either the first or second field current control program.

9. The method of claim 7 wherein the first and second field current control program are stored in a memory in the alternator.

10. The method of claim 7 further comprising the step of continuing to execute either the first field current control program or the second field current control program until a reset instruction is received.

11. The method of claim 10 wherein the reset instruction comprises removing regulator power and subsequently restoring regulator power.

12. The method of claim 7 further comprising the step of receiving vehicle identification information from an electronics control module positioned in the vehicle.

13. The method of claim 12 wherein the vehicle identification information includes vehicle make and model identification information.

14. An alternator configured for use in a vehicle having an electronic control module storing vehicle identification information, the alternator comprising:
   a stator including a plurality of stator windings;
   a rotatable field coil adjacent to the stator;
   a regulator comprising
      a field driver circuit configured to deliver an electric current to the field coil; and
      a controller configured to execute a plurality of different field current control programs and control the electric current delivered to the field coil, the controller configured to receive the vehicle identification information from the electronic control module, wherein the controller executes one of the plurality of field current control programs based on the vehicle identification information received from the electronics control module.

15. The alternator of claim 14 wherein the regulator includes a memory, wherein the first field current control program and the second field current control program are stored in the memory.

16. The alternator of claim 14 wherein the controller is positioned within a regulator and wherein the controller is configured to continue executing the one of the plurality of field current control programs until a reset instruction is received by the regulator.

17. The alternator of claim 16 wherein the reset instruction comprises removing regulator power and subsequently restoring regulator power.

18. The alternator of claim 14 wherein the vehicle identification information includes a make and model of vehicle.

* * * * *